United States Patent
Matsuo et al.

(10) Patent No.: US 12,480,905 B2
(45) Date of Patent: Nov. 25, 2025

(54) GAS CONCENTRATION MEASURING DEVICE AND METHOD FOR MEASURING CONCENTRATION OF ANALYTE GAS IN SAMPLE GAS

(71) Applicant: Mitsui Mining & Smelting Co., Ltd., Tokyo (JP)

(72) Inventors: Haruki Matsuo, Ageo (JP); Shingo Ide, Ageo (JP)

(73) Assignee: MITSUI MINING & SMELTING CO., LTD. (JP)

( * ) Notice: Subject to any disclaimer, the term of this patent is extended or adjusted under 35 U.S.C. 154(b) by 0 days.

(21) Appl. No.: 18/941,306

(22) Filed: Nov. 8, 2024

(65) Prior Publication Data

US 2025/0164430 A1    May 22, 2025

Related U.S. Application Data

(63) Continuation-in-part of application No. PCT/JP2023/041653, filed on Nov. 20, 2023.

(51) Int. Cl.
*G01N 27/12* (2006.01)

(52) U.S. Cl.
CPC .................................. *G01N 27/125* (2013.01)

(58) Field of Classification Search
CPC ..... G01N 27/00–128; G01N 2027/222; G01N 27/125
See application file for complete search history.

(56) References Cited

U.S. PATENT DOCUMENTS

| | | | |
|---|---|---|---|
| 2009/0090626 A1* | 4/2009 | Holt | H01M 8/04216 436/2 |
| 2016/0355396 A1 | 12/2016 | Tu | |
| 2021/0364458 A1* | 11/2021 | Nakamura | G01N 27/128 |
| 2024/0201117 A1* | 6/2024 | Shibata | G01N 27/16 |
| 2024/0210342 A1* | 6/2024 | Okamoto | G01N 27/123 |

FOREIGN PATENT DOCUMENTS

| | | |
|---|---|---|
| DE | 10247857 A1 | 4/2004 |
| JP | H02-179459 A | 7/1990 |
| JP | H06-102227 A | 4/1994 |
| JP | H06-118047 A | 4/1994 |
| JP | 2005-156364 A | 6/2005 |

(Continued)

OTHER PUBLICATIONS

JP-6913493-B2—translate to English (Year: 2021).*

(Continued)

*Primary Examiner* — Fatemeh Esfandiari Nia
(74) *Attorney, Agent, or Firm* — Harness, Dickey & Pierce, P.L.C.

(57) ABSTRACT

Provided is a gas concentration measuring device including a heat generating resistor that generates heat when electricity is supplied and a stage supporting the resistor. The resistor and the stage overlap in plan view. The stage has a plan view area S of $3.6 \times 10^7$ μm² or less. The ratio of the area S to the total volume V of the heat generating resistor and the stage, S/V, ranges from 0.0010 to 10 μm⁻¹. The device is configured to measure an oxygen gas concentration in a sample gas on the basis of the resistance of the heat generating resistor.

2 Claims, 10 Drawing Sheets

(56) References Cited

FOREIGN PATENT DOCUMENTS

| | | | | |
|---|---|---|---|---|
| JP | 2005-300452 A | 10/2005 | | |
| JP | 5412006 B1 | 2/2014 | | |
| JP | 2014-190878 A | 10/2014 | | |
| JP | 2015-169552 A | 9/2015 | | |
| JP | 2016-042054 A | 3/2016 | | |
| JP | 6913493 B2 * | 8/2021 | | |
| JP | 2022-129947 A | 9/2022 | | |
| JP | 2023-070839 A | 5/2023 | | |
| KR | 20100096610 A * | 9/2010 | ......... | G01N 33/0037 |
| WO | 2014-041830 A1 | 3/2014 | | |

OTHER PUBLICATIONS

JP 2014190878 A2—translate to English (Year: 2014).*
JP H02179459 A—English (Year: 1990).*
KR-20100096610-A (Year: 2010).*
Notice of Reasons for Refusal for corresponding Japanese Patent Application No. 2023-572059 mailed Dec. 19, 2023, with English translation (24 Pages).
Decision to Grant a Patent for corresponding Japanese Patent Application No. 2023-572059 mailed Jan. 23, 2024, with English translation (7 Pages).
"Gas sensor"; SEMITEC Corporation, Tokyo, Japan website; https://www.semitec-global.com/products/appliedthermistor_gussensor; undated (total 3 pages).
"Thermal Conductivity Method Sensor: TE"; Riken Keiki Co., Ltd., Tokyo, Japan; https://product.rikenkeiki.co.jp/assets/pdf/tech_info/TE_Sensor_E_2106.pdf; undated (total 1 page).

\* cited by examiner

GAS CONCENTRATION MEASURING DEVICE AND METHOD FOR MEASURING CONCENTRATION OF ANALYTE GAS IN SAMPLE GAS

CROSS REFERENCE TO RELATED APPLICATIONS

This application is a continuation-in-part of International Application No. PCT/JP2023/041653, filed on Nov. 20, 2023, the disclosure of which is expressly incorporated by reference herein in its entirety.

BACKGROUND

Technical Field

This invention relates to a gas concentration measuring device used to measure the concentration of an analyte gas in a sample gas and a method for measuring the concentration of an analyte gas in a sample gas.

Related Art

Various types of gas detection devices for measuring an analyte gas concentration in a sample gas are known. One of them is a thermal conductivity gas sensor that measures an analyte gas concentration in a sample gas by utilizing the heat lost by thermal conduction from a heat generating resistor to the sample gas.

JP 2005-156364A discloses a combustible gas detector having a thermal conductivity gas detecting unit.

As described in JP 2005-156364A, various types of gas sensors have been proposed, but the conventional ones have room for improvement in terms of manufacturing simplicity.

SUMMARY

An object of the invention is to provide a gas concentration measuring device that can easily be manufactured.

The invention provides a gas concentration measuring device for measuring oxygen gas concentration in a sample gas. The device includes a heat generating resistor that generates heat when electricity is supplied and a stage that supports the resistor. The heat generating resistor overlaps the stage in plan view. The stage has an area S of $3.6 \times 10^7$ $\mu m^2$ or less in plan view. The ratio of S to the total volume V of the heat generating resistor and the stage is 0.0010 to 10 $\mu m^{-1}$. The device is configured to measure the concentration of oxygen gas in a sample gas on the basis of the resistance of the resistor.

The invention also provides a method for measuring a concentration of an analyte gas in a sample gas. The method includes using the gas concentration measuring device of the invention.

DETAILED DESCRIPTION

The invention will be elaborated upon on the basis of its preferred embodiments with reference to the accompanying drawings.

Figure 1:
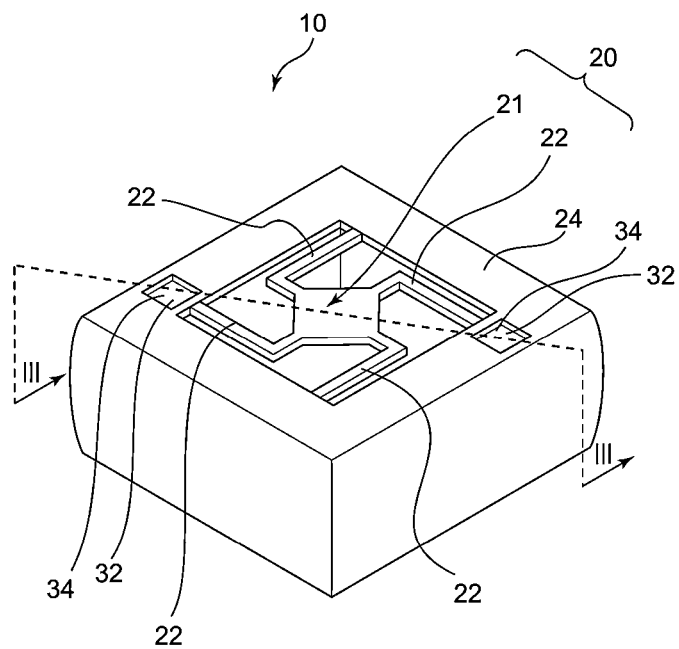
FIG. 1 is a schematic perspective view of a gas concentration measuring device according to a preferred embodiment of the invention.
Figure 2:
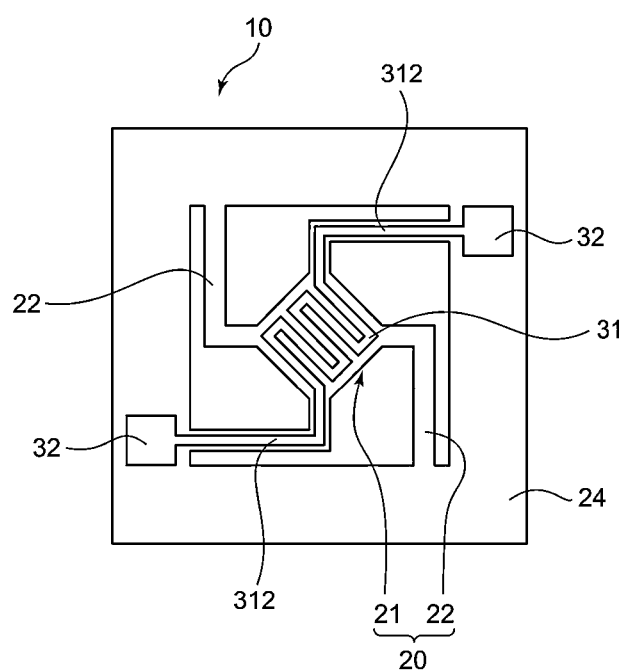
FIG. 2 is a plan view of the gas concentration measuring device of FIG. 1, showing the position and shape of the heat generating resistor used therein.
Figure 3:
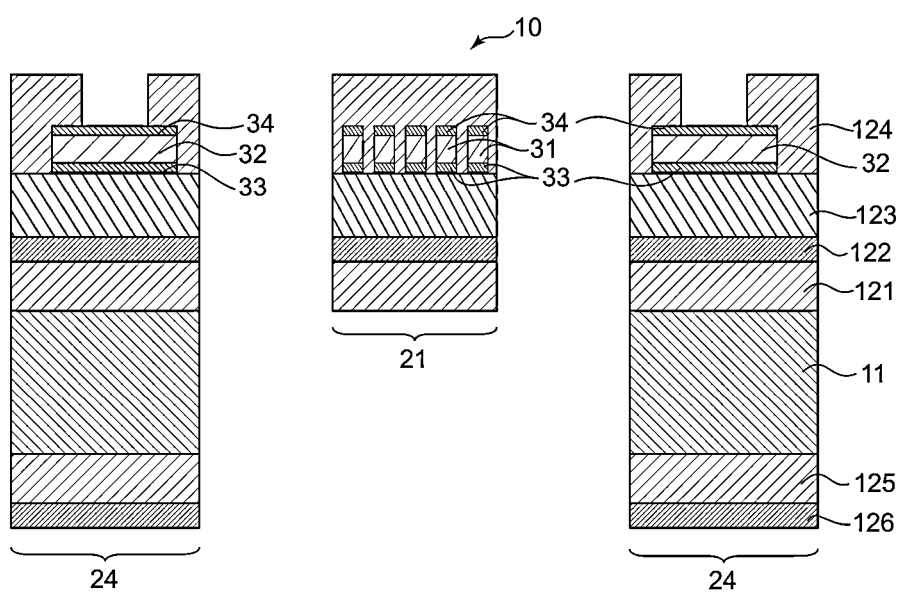
FIG. 3 is a cross-sectional view of the gas concentration measuring device of FIG. 1, taken along line III-III.

FIGS. 1 through 3 illustrate a preferred embodiment, hereinafter a first embodiment, of the gas concentration measuring device of the invention. The gas concentration measuring device 10, hereinafter simply "the device 10", of the first embodiment includes a stage 21 and one or more bridges 22 extending from the periphery of the stage 21. The stage 21 and the bridges 22 form a bridge structure 20. The bridge structure 20 of the device 10 of FIG. 1 is composed of the stage 21 that is plate-shaped and rectangular in plan view and four bridges 22 extending from the periphery of the stage 21. The bridges 22 extend from the respective corners of the stage 21. The device 10 further includes a peripheral portion 24 surrounding the stage 21 and connecting to the bridges 22. The plan view shape of the stage 21 is not limited to a rectangle.

As illustrated in FIG. 3, the stage 21 has a multilayer structure. Specifically, the stage 21 has a four-layer structure composed of a first insulating layer 121, a second insulating layer 122 formed on the first insulating layer 121, a third insulating layer 123 formed on the second insulating layer 122, and a fourth insulating layer 124 formed on the third insulating layer 123. The layer configuration of the stage 21 is not limited to the embodiment shown and may be a single, dual, or triple layer structure.

In the device 10 shown in FIG. 2, the fourth insulating layer 124 and a second adhesion layer 34 described later are omitted to explicitly show the position and shape of a heat generating resistor 31 described below.

The device 10 includes a heat generating resistor 31, hereinafter simply "the resistor 31", that generates heat when electricity is supplied. The resistor 31 and the stage 21 overlap in plan view such that the resistor 31 is supported by the stage 21. More specifically, in the first embodiment shown in FIGS. 1 to 3, the stage 21 contains the resistor 31 within its thickness. In this embodiment, the resistor 31 is disposed on the third insulating layer 123, and the fourth insulating layer 124 is disposed on and around the resistor 31. Thus, the resistor 31 is surrounded by the third insulating layer 123 and the fourth insulating layer 124, so that it is protected from contact with the surrounding gas and thereby has improved durability.

The resistor 31 is preferably formed of a continuous strand. As used herein, the term "continuous strand" refers to not only a single strand but also a plurality of strands having at least both ends in common.

The continuous strand arranged in the stage 21 forms the resistor 31 in the stage 21. The continuous strand extends through two out of the four bridges 22 to the peripheral portion 24, forming two wires 312. That is, the continuous strand includes the resistor 31 disposed within the stage 21 and the wires 312 extending through the bridges 22 to the peripheral portion 24. In order to form such two wires 312, it is preferred that at least two bridges 22 extend from the periphery of the stage 21. In order to support the stage 21 in a more stable and reliable manner, it is preferred that the stage 21 have at least three, more preferably at least four, bridges extending therefrom.

The resistor 31 is connected through the two wires 312 to the respective wire bonding pads 32, hereinafter simply "pads 32" disposed on the peripheral portion 24.

The resistor 31 shown in FIG. 2 is formed of a single strand. The single strand in the stage 21 extends without crossing, serpentining repeatedly in one direction and in an opposite direction. By this configuration, the resistor 31 can have an increased resistance, thereby making it feasible to measure gas concentrations with reduced power consumption.

An embodiment in which the resistor 31 is formed of a plurality of strands having at least both ends in common includes a configuration (unshown) in which at least two strands are arranged without crossing in the stage 21, and share all the portions disposed in the bridges 22 or completely overlap each other in the bridges 22.

To sufficiently enhance the physical strength of the resistor 31 and to sufficiently increase the resistance of the resistor 31 thereby to reduce the power consumption of the device 10, the resistor 31 preferably has a thickness of 0.01 to 100 μm, more preferably 0.02 to 75 μm, even more preferably 0.05 to 50 μm.

The thicknesses of the heat generating resistor and a first and a second adhesive layers 33 and 34 described later can be measured using a stylus profiler, an electron microscope, or a 3D optical profiler.

When electricity is supplied to the resistor 31 to generate heat, the amount of heat generated and the amount of heat absorbed by the surrounding sample gas to be measured will eventually become identical and a steady state is reached. At this time, the temperature of the resistor 31 depends on the thermal conductivity (heat absorption property) of the sample gas. Because the thermal conductivity of the sample gas varies with the composition of the gas, the temperature of the resistor in the steady state described above varies with the composition of the sample gas. Therefore, the concentration of an analyte gas in the sample gas can be obtained on the basis of the resistance of the resistor 31 at that time.

As a result of the inventors' study, it has been found that, by limiting the thermal capacity of the resistor 31 and its surroundings to or below a predetermined value, the change in temperature of the resistor 31 with the change in concentration of the analyte gas can be sufficiently increased, thereby sufficiently increasing the detection accuracy and sensitivity for the analyte gas in a sample gas. Specifically, the total thermal capacity of the resistor 31 and the stage 21 is preferably $3.2\times10^{-2}$ J/K or less, more preferably $2.2\times10^{-2}$ J/K or less, even more preferably $1.5\times10^{-2}$ J/K or less.

In terms of the consumption power reduction, the total thermal capacity of the resistor 31 and the stage 21 is preferably $1.0\times10^{-10}$ J/K or more, more preferably $1.0\times10^{-9}$ J/K or more, even more preferably $2.0\times10^{-9}$ J/K or more.

As stated earlier, the device 10 shown in FIGS. 1 to 3 has the bridge structure 20 composed of the stage 21 containing the resistor 31 in its interior and the bridges 22. By adopting the device 10 having such a configuration as a gas concentration measuring device, the thermal capacity of the resistor 31 and the portion overlapping the resistor 31 in plan view can be easily controlled within the above range.

In order to control the thermal capacity of the resistor 31 and the portion overlapping the resistor 31 in plan view within the above range and to ensure sufficient mechanical strength of the resistor 31, the plan view area S of the stage 21 is preferably $3.6\times10^{7}$ μm$^2$ or less, more preferably $3.0\times10^{7}$ μm$^2$ or less, even more preferably $2.5\times10^{7}$ μm$^2$ or less. In order to increase the efficiency of heat conduction to a sample gas, the area S is preferably at least 100 μm$^2$, more preferably 200 μm$^2$ or more, even more preferably 400 μm$^2$ or more.

For the same purposes, when the stage 21 is rectangular, the length of each side of the stage 21 is preferably 10 to 3000 μm, more preferably 12.5 to 2500 μm, even more preferably 20 to 2000 μm, provided that the area S is within the above range.

In order to secure a sufficient amount of heat absorption by a sample gas to improve the detection accuracy and sensitivity for an analyte gas, the total volume V of the resistor 31 and the stage 21 is preferably such that the ratio of S to V, S/V, is 0.0010 μm$^{-1}$ or more, more preferably 0.00125 μm$^{-1}$ or more, even more preferably 0.0016 μm$^{-1}$ or more. To reduce the power consumption, the S/V is preferably 10 μm$^{-1}$ or less, more preferably 7.0 μm$^{-1}$ or less, even more preferably 5.0 μm$^{-1}$ or less.

With a view to a further increase in the detection accuracy and sensitivity for an analyte gas, the resistor 31 preferably has high temperature dependence of its resistance. Specifically, the resistor 31 preferably has a temperature coefficient of resistance (TCR) at at 25° C. of 100 ppm/° C. or more, more preferably 500 ppm/° C. or more, even more preferably 1000 ppm/° C. or more.

Materials having a TCR $\alpha_t$ at 25° C. of 100 ppm/° C. or more include platinum, tungsten, copper, gold, silver, molybdenum, aluminum, and tantalum and their alloys. Examples of platinum alloys include Pt—Nb, Pt—Rh, and Pt—W. Also included are cermets composed a platinum-group element (i.e., platinum, palladium, rhodium, ruthenium, iridium, or osmium) and/or an alloy thereof and a metal oxide. Accordingly, the resistor 31 preferably contains at least one member selected from the group of the materials recited above. Inter alia, it is preferred for the resistor 31 to contain platinum or a platinum-containing alloy in terms of stability in high temperature environments.

In order to improve the durability of the device 10 by enhancing the adhesion between the resistor 31 and each of the third insulating layer 123 and the fourth insulating layer 124, it is preferred to dispose a first adhesion layer 33 and a second adhesion layer 34 in contact with the lower and upper surfaces, respectively, of the resistor 31. When the first adhesion layer 33 and the second adhesion layer 34 are provided in contact with the lower and upper surfaces, respectively, of the resistor 31, it is preferred that these adhesion layers are also disposed in contact with the lower and upper surfaces of the wires 312 and the pads 32. In view of sufficient adhesion between the resistor 31 and the third and fourth insulating layers 123 and 124, the first and second adhesion layers 33 and 34 each preferably have a thickness of 1 to 200 nm, more preferably 2 to 150 nm, even more preferably 10 to 100 nm.

As illustrated in FIGS. 1 and 3, a part of the fourth insulating layer 124 having once formed on each pad 32 has been removed, so that the underlying second adhesion layer 34 (or the pad 32 when the second adhesion layer is not provided) is exposed in that part.

As previously described, the device 10 has the peripheral portion 24 surrounding the stage 21. The peripheral portion 24 and the stage 21 are preferably spaced apart from each other while being connected by the bridges 22.

The peripheral portion 24 preferably includes a substrate 11 and a plurality of insulating layers on each of the upper and lower sides of the substrate 11. Specifically, as shown in FIG. 3, the substrate 11 has the first insulating layer 121, the second insulating layer 122, the third insulating layer 123, and the fourth insulating layer 124 deposited in this order on the upper side thereof and a fifth insulating layer 125 and a sixth insulating layer 126 deposited in this order on lower side thereof.

The device 10 may or may not have the fifth insulating layer 125 and the sixth insulating layer 126. The presence or absence of these insulating layers can adjust the stresses applied to the substrate 11.

The materials forming the above-described layers will then be described.

The substrate 11 preferably contains silicon (Si).

The insulating layers formed on the upper and the lower side of the substrate 11 preferably contain a silicon compound, more preferably silicon dioxide ($SiO_2$) or silicon nitride ($SiN_x$, where x is from 0.100 to 1.667), in terms of availability, ease of film formation, and chemical stability. Specifically, the first insulating layer 121, third insulating layer 123, fourth insulating layer 124, and fifth insulating layer 125 are preferably formed of $SiO_2$, and the second and the sixth insulating layer 122 and 126 are preferably formed of $SiN_x$.

For improved adhesion between the first adhesion layer 33 and the third insulating layer 123 and between the second adhesion layer 34 and the fourth insulating layer 124, the first and second adhesion layers 33 and 34 preferably contain at least one of tantalum (Ta), titanium (Ti), titanium nitride, titanium oxide, titanium oxynitride, tantalum oxide, zirconium, zirconium oxide, yttrium, yttrium oxide, tungsten, tungsten oxide, chromium, chromium oxide, nickel, and nickel oxide, and alloys thereof.

The materials forming the resistor 31 are as described above. The material forming the pad 32 can be selected from those recited for the resistor 31. The resistor 31 and the pad 32 may be made of the same or different materials. The resistor 31 and the pad 32 are preferably formed of the same material from the standpoint of ease of manufacture and manufacturing cost containment.

Figure 5:
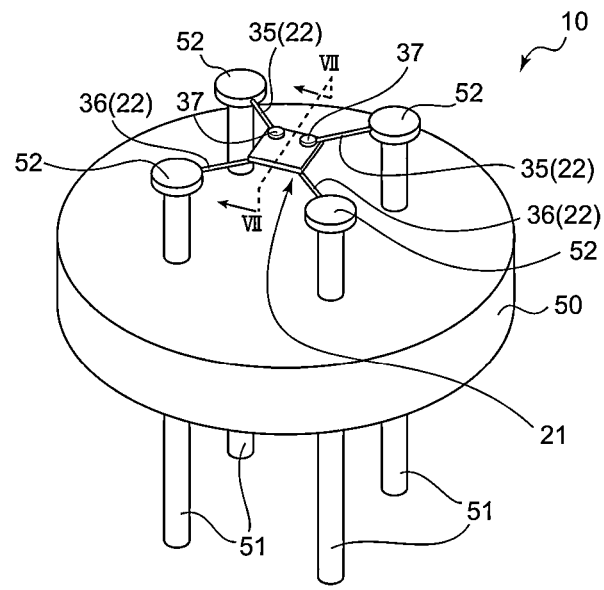
FIG. 5 is a perspective view of a gas concentration measuring device according to another embodiment of the invention.
Figure 6:
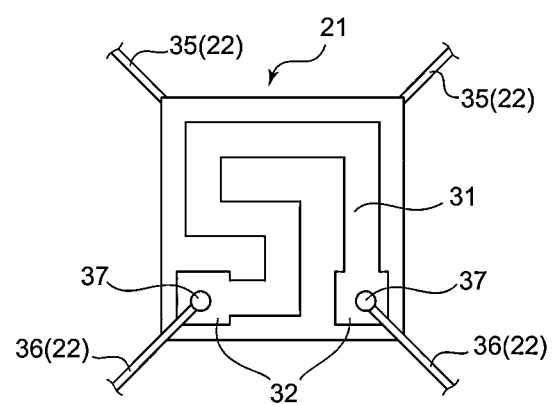
FIG. 6 is a plan view of the stage of the gas concentration measuring device shown in FIG. 5, viewed from the reverse side.
Figure 7:
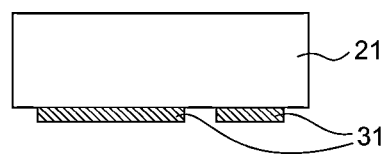
FIG. 7 is a cross-sectional view of the gas concentration measuring device of FIG. 5, taken along line VII-VII.

FIG. 5 shows a device 10 according to another embodiment, hereinafter "second embodiment", of the invention, and FIG. 6 is a reverse plan view of a stage 21, the details of which will be described below, of the device 10 of FIG. 5. FIG. 7 is a cross-section of the device 10 of FIG. 5, taken along line VII-VII.

The description of the second embodiment shown in FIGS. 5 through 7 will generally be confined to the differences from the first embodiment shown in FIGS. 1 through 3. Otherwise, the description of the first embodiment applies to the second one as appropriate.

The device 10 of the second embodiment includes a terminal support 50 and a plurality of columnar members 51 extending through the thickness of the terminal support 50. Each columnar member 51 has on the upper end thereof a terminal 52 for wire bonding.

The device 10 includes a stage 21 and a plurality of bridges 22 extending from the periphery of the stage 21. The stage 21 is secured to the terminals 52 via the respective bridges 22. In detail, the stage 21 is bonded to two bridges 22, hereinafter "first supports 35", at respective bonds 37 provided on the upper side of the stage 21 as shown in FIG. 5 and also bonded to another pair of bridges 22, hereinafter "second supports 36", at respective bonds 37 provided on the lower reverse side of the stage 21 as illustrated in FIG. 6. The bridges 22 of the second embodiment each have the shape of wire as illustrated in FIG. 5.

As illustrated in FIGS. 6 and 7, the stage 21 has a heat generating resistor 31 and two pads 32 formed on one side thereof. In other words, the stage 21 supports the resistor 31 and the pads 32. On each of the pads 32, a bond 37 is provided at which the pad 32 and the second support 36 are bonded to each other. When the second support 36 is made of an electrically conductive material, electricity can be supplied to the resistor 31 is energized by connecting the columnar member 51 to a power source because the resistor 31 is electrically connected to the columnar member 51 via the second support 36. For this purpose, the second support 36 preferably contains, for example, platinum. On the other hand, the first support 35 of the present embodiment is solely for supporting the stage 21. Therefore, the material forming the first support 35 need not be electrically conductive.

While the resistor 31 of the second embodiment consists of a single strand, it does not extend to and through the bridges 22.

The stage 21 may be single-layered or multi-layered but is preferably single-layered for simplifying the manufacturing process. Examples of the material for forming the stage 21 include silicon, alumina, glass, forsterite, polyimide, polyamide, polycarbonate, polyamide-imide, polyacetal, polyphenylene ether, polybutylene terephthalate, fluororesins, epoxy resins, and phenol resins.

In order to secure reliable physical strength and reduce the thermal capacity of the stage 21, the stage 21 preferably has a thickness of 0.5 to 2000 µm, more preferably 1.0 to 1000 µm, even more preferably 1.5 to 500 µm.

With a view to enhancing the physical strength of the first support 35 and second support 36 and reducing heat dissipation from the resistor, the first and second supports 35 and 36 each preferably have a diameter of 1.0 to 100 µm, more preferably 5.0 to 80 µm, even more preferably 10 to 50 µm.

The terminal support 50 is preferably made of an insulator, and the columnar members 51 and the terminals 52 are preferably made of a conductor. The columnar members 51 and the terminals 52 may be made of the same or different materials.

Figure 9:
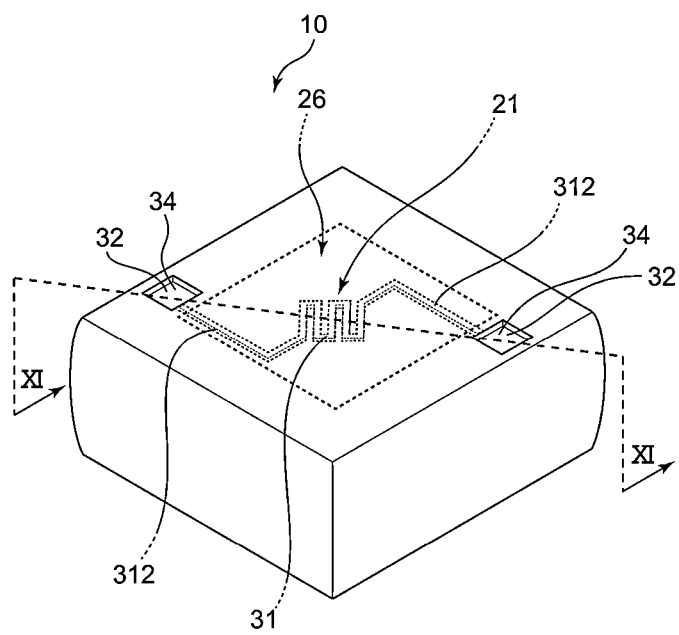
FIG. 9 is a perspective view of a gas concentration measuring device according to still another embodiment of the invention, corresponding to FIG. 1.
Figure 10:
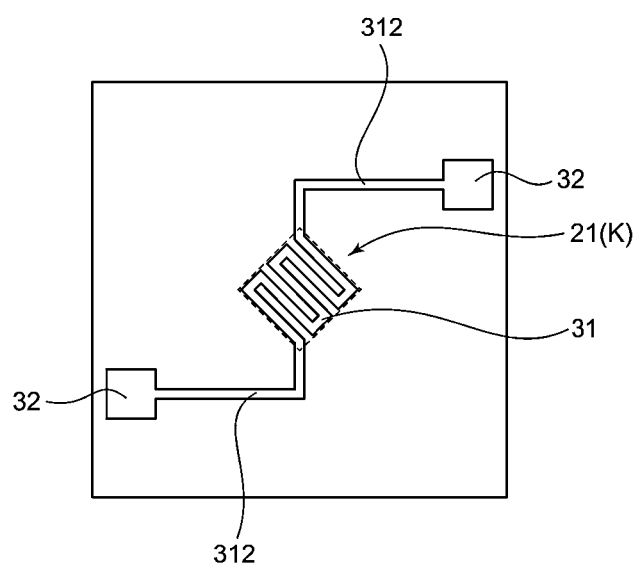
FIG. 10 is a plan view of the gas concentration measuring device of FIG. 9, showing the position and shape of the heat generating resistor used therein, corresponding to FIG. 2.
Figure 11:
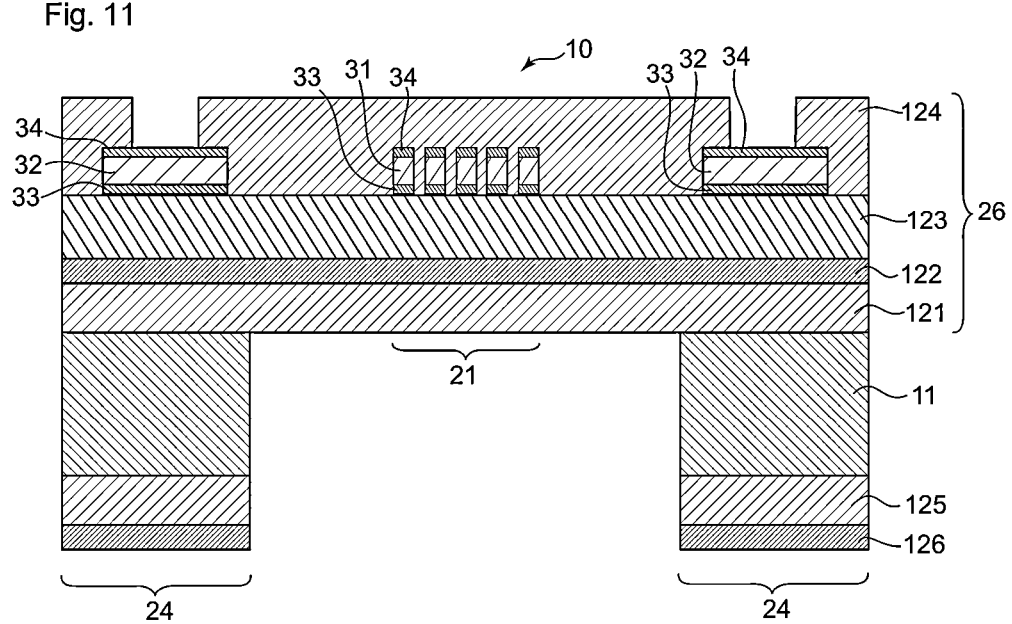
FIG. 11 is a cross-sectional view of the gas concentration measuring device of FIG. 9, taken along line XI-XI, corresponding to FIG. 3.

FIGS. 9 through 11 illustrate a device 10 according to still another embodiment, hereinafter a third embodiment, of the invention. The description of the third embodiment will generally be confined to the differences from the first embodiment of FIGS. 1 to 3. Otherwise, the description of the first embodiment applies to the third embodiment as appropriate. FIGS. 9 to 11 correspond to FIGS. 1 to 3, respectively.

Unlike the device 10 of the first embodiment (FIGS. 1 to 3), the device 10 of the third embodiment has a first insulating layer 121, a second insulating layer 122, and a third insulating layer 123 formed over the entire planar area of the device 10 (FIG. 11) and also a fourth insulating layer 124 formed over the entire planar area of the device 10 except the portions where pads 32 are provided. Because of this configuration, the device 10 of the third embodiment does not have bridges 22 and a bridge structure 20 (FIGS. 9 and 10).

The first insulating layer 121, the second insulating layer 122, the third insulating layer 123, and the fourth insulating layer 124 form a diaphragm 26. That is, the device 10 includes the diaphragm 26 and a peripheral portion 24 surrounding the diaphragm 26. The device 10 further includes a resistor 31 disposed within the diaphragm 26 at any position in the thickness direction of the diaphragm 26. The diaphragm 26 is in the form of a thin film with a thickness in the range given above as the thickness of the stage 21. The diaphragm 26 of the illustrated embodiment is rectangular with the side length preferably ranging from 100 to 4500 μm, more preferably from 150 to 3000 μm, even more preferably from 200 to 1500 μm. The shape of the diaphragm 26 is not limited to a rectangle.

As illustrated in FIGS. 9 and 10, the device 10 of the third embodiment includes the resistor 31 and two wires 312 connecting the resistor 31 to the respective pads 32. The resistor 31 connects at each of its ends to the end of the respective wires 312, thereby forming a single strand as a whole.

In the third embodiment, when the resistor 31 and the wires 312 are made of the same material, the part of the single strand where the strand runs compactly in, for example, a serpentine pattern is defined as the resistor 31, while the part extending outwardly from the resistor 31 is defined as the wire 312. The resistor 31 is located in the generally central portion of the diaphragm 26.

In FIG. 10, the figure created by connecting the outermost edges of the resistor 31 in the plan view of the device 10 is designated figure K. The portion of the device 10 that is delineated by figure K in the plan view except the resistor 31 is defined as the stage 21 of the device 10. In FIG. 10, figure K is indicated by a broken line and is rectangular.

Accordingly, the term "plan view area S of a stage 21" has the same meaning as the area of figure K in the third embodiment, and the term "total volume V of the resistor 31 and the stage 21" has the same meaning as the volume of the portion delineated by the figure K in plan view.

The method for measuring an analyte gas concentration in a sample gas by using the device 10 of FIGS. 1 to 3, the device 10 of FIGS. 5 to 7, and the device 10 of FIGS. 9 to 11 will next be described.

To measure the concentration of an analyte gas in a sample gas by using the device 10, the heat generating resistor 31 is energized to generate heat. The conditions for energization are not particularly limited as long as a good linear relationship is established between the concentration of the analyte gas in the sample gas and the resistance of the resistor. For example, the energization can be performed under a constant power condition, i.e., under a condition such that the amount of heat generated by the energized resistor 31 is constant even when the analyte gas concentration in a sample gas varies. Instead, the energization can be carried out under a constant voltage condition, i.e., under such a condition that the voltage applied to the resistor 31 is constant even when the analyte gas concentration in a sample gas varies, or under a constant current condition, i.e., under a condition such that the current flowing in the resistor 31 is constant even when the analyte gas concentration in a sample gas varies. As used herein, the term "constant power" does not mean that the power should be strictly constant during the measurement of the analyte gas concentration. The concentration of an analyte gas can be determined with sufficient accuracy if the power fluctuation during the measurement is not more than 1%, more preferably not more than 0.5%. Even if the power fluctuates within such a range during the measurement, the measurement is considered to be performed under a constant power condition. This also applies to the terms "constant voltage" and "constant current".

Because the resistance of the resistor 31 changes with the temperature of the resistor 31 regardless of the energization condition, the analyte gas concentration can be determined on the basis of the resistance of the resistor 31.

In order to facilitate the sample gas to absorb the heat generated by the resistor 31 to further improve the accuracy of measurement of an analyte gas concentration, it is preferred that the temperature of the resistor 31 be sufficiently increased by energization during the measurement. Specifically, it is preferred that the temperature difference between the resistor 31 and the sample gas is maintained at 30° C. or more, more preferably 60° C. or more, even more preferably 100° C. or more, by supplying electricity to the resistor 31.

In an attempt to minimize thermal degradation of the resistor 31, the temperature difference between the resistor 31 and the sample gas is maintained at preferably 800° C. or less, more preferably 750° C. or less, even more preferably 700° C. or less.

Examples of the analyte gas to be detected include oxygen, nitrogen, argon, water vapor, hydrogen, helium, and carbon dioxide, with oxygen, water vapor, and carbon dioxide being suitable.

When oxygen is an analyte gas, because oxygen has a relatively low thermal conductivity, the temperature change of the resistor 31 with the change of the oxygen gas concentration is small. This has raised the problem with conventional thermal conduction gas sensors that the accuracy of oxygen gas measurement tends to be low. When a sample gas contains oxygen and nitrogen, such as air, because oxygen and nitrogen have low thermal conductivities, it has been particularly difficult to measure the oxygen gas concentration of such a sample gas with high accuracy using conventional thermal conduction sensors.

In contrast, because the device 10 exhibits sufficiently enhanced changes in temperature of the resistor 31 in accordance with the change of an anolyte gas concentration as described, the concentration of the analyte gas, even when it is oxygen, can be measured with high accuracy. Likewise, the device 10 is capable of measuring an oxygen gas concentration with high accuracy even when a sample gas contains oxygen and nitrogen.

To maximize the above-mentioned advantage of the device 10, the total content of oxygen and nitrogen in a sample gas is preferably at least 0.00001 vol %, more preferably 0.0001 vol % or more, even more preferably 0.001 vol % or more.

As described, the device 10 is capable of measuring the concentration of an analyte gas in a sample gas with high accuracy even though the resistor 31 is the only analyte gas-sensitive element. Thus, the device 10 is composed of a relatively small number of members and can therefore be easily and conveniently manufactured.

As used herein, the term "analyte gas-sensitive element" denotes a member that changes in any property in accordance with an analyte gas concentration in a sample gas. Since the resistor 31 changes its resistance with the concentration of an analyte gas in a sample gas when electricity is supplied, it meets the definition of "analyte gas-sensitive element".

Also included in the term "analyte gas-sensitive element" is an electrode unit whose current value changes with the concentration of an analyte gas in a sample gas, the unit being composed of a positive electrode, a negative electrode, and an electrolyte interposed between the opposing electrodes.

Also included in the term "analyte gas-sensitive element" are semiconductors, such as tin oxide and zinc oxide, and piezoelectric materials, such as barium titanate, zirconium titanate, and zinc oxide.

A preferred method for manufacturing the gas concentration measuring device of the invention will be described with particular reference to the device 10 of FIGS. 1 to 3. FIGS. 4(a) through 4(e) are a preferred process flow diagram for manufacturing the device 10 of FIGS. 1 to 3. The method includes the following steps in this order: (1) forming insulating layers on a substrate 11, (2) forming a resistor 31 on the insulating layer, (3) forming a fourth insulating layer 124 on and around the resistor 31, and (4) forming a bridge structure 20.

1. Step of Forming Insulating Layers on Substrate 11

A substrate 11 is thermally oxidized by heating at 700° to 1400° C. in an oxygen- or water vapor-containing atmosphere to form a first insulating layer 121 and a fifth insulating layer 125, each consisting of $SiO_2$, on the surface of the substrate 11. Thereafter, a second insulating layer 122 and a sixth insulating layer 126 each consisting of $SiN_x$ are formed on the first insulating layer 121 and the fifth insulating layer 125, respectively, by means of a thin-film deposition process described below.

The thin-film deposition process includes physical vapor deposition (PVD), such as vacuum deposition, sputtering, and ion plating; and chemical vapor deposition (CVD). In particular, the second insulating layer 122 and the sixth insulating layer 126 are preferably formed by plasma-enhanced chemical vapor deposition (PECVD) or low-pressure chemical vapor deposition (LPCVD) in terms of residual stress adjustability and mass productivity. Note that the first, second, third, fifth, and sixth insulating layers 121, 122,123, 125, and 126 are omitted from FIGS. 4(a) to 4(e).

Figure 4:
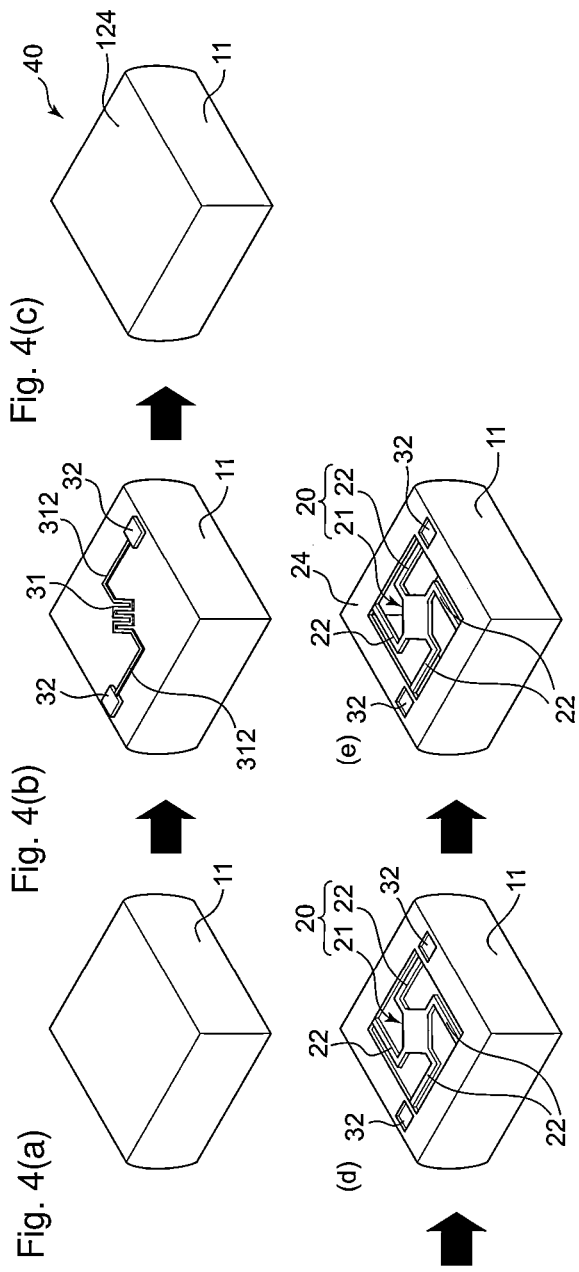
FIGS. 4(a) to 4(c) are perspective views schematically illustrating a preferred method for producing the gas concentration measuring device of FIG. 1.

A third insulating layer 123 is then provided on the second insulating layer 122 (FIG. 4(a)). The third insulating layer 123 is formed over the entire area of the substrate 11. The third insulating layer 123 can be formed by any of the above recited thin film deposition processes. Inter alia, when forming the third insulating layer 123 of $SiO_2$, PECVD is preferred in terms of residual stress adjustability and mass productivity.

2. Step of Forming Resistor 31 on Insulating Layer

Where needed, a first adhesion layer 33 is provided prior to the formation of a resistor 31. The first adhesion layer 33 can be formed by patterning by a lift-off process. In detail, a photoresist layer (not shown) is provided over the entire area of the third insulating layer 123, followed by exposure to light and subsequent development to leave a mask (unshown) complementary to a desired pattern of the first adhesion layer 33 on the third insulating layer 123. The first adhesion layer 33 is then deposited by a thin-film deposition process with the mask on the third insulating layer 123. As the thin-film deposition process, sputtering is preferred in terms of mass productivity. Finally, the mask (photoresist layer) is removed to leave the first adhesion layer 33 in the desired pattern.

A resistor 31 is then formed (FIG. 4(b)). In this method, the resistor 31, wires 312, and pads 32 are formed simultaneously to simplify the process. The simultaneous formation of the resistor 31, wires 312, and pads 32 is preferably accomplished by forming a thin film over the entire area of the substrate 11 by any one of the above-described thin-film deposition processes, followed by patterning. The thin film formation is preferably performed by sputtering from the standpoint of mass productivity.

In order to reduce the formation of flashes around the edge of the resistor 31, the patterning is preferably carried out by milling. Instead of milling, a lift-off process can also be used. The formation of the resistor 31 by lift-off is the same as for the first adhesion layer 33 so that it will not be described redundantly.

If necessary, the formation of the resistor 31 is followed by the formation of a second adhesion layer 34. The second adhesion layer can be formed in the same manner as for the first adhesion layer 33. In FIG. 4(b) the first adhesion layer 33 and the second adhesion layer 34 are omitted.

3. Step of Forming Fourth Insulating Layer 124 on and Around Resistor 31

After the resistor 31 and, if necessary, the first and second adhesion layers 33 and 34 are deposited, a fourth insulating layer 124 is formed. The fourth insulating layer 124 is provided over the entire area of the substrate 11 (FIG. 4(c)). The fourth insulating layer 124 can be deposited in the same manner as for the third insulating layer 123.

Thus, the foregoing steps provide a structure 40 including the insulating layers and the resistor 31.

4. Step of Forming Bridge Structure 20

First, unnecessary portions of the insulating layers on the upper side of the substrate 11, i.e., the first insulating layer 121, second insulating layer 122, third insulating layer 123, and fourth insulating layer 124 are removed (FIG. 4(d)). As used herein, the term "unnecessary portions" refers to the portions that do not overlap either the bridge structure 20 or the peripheral portion 24 in plan view of the device 10 (FIG. 1).

In step 4, a portion of the fourth insulating layer 124 on each of the pads 32 may be removed simultaneously with the removal of the unnecessary portions to expose the pads 32. If desired, a portion of the second adhesion layer 34 may also be removed at this time.

Removal of the unnecessary portions can be achieved by an etching process, such as dry etching or wet etching.

Useful dry etching processes include reactive ion etching (RIE) using fluorocarbon or a halogen gas. Useful wet etching processes include isotropic etching using hydrofluoric acid, nitric acid, sulfuric acid, or phosphoric acid or anisotropic etching using an alkali solution, such as potassium hydroxide (KOH), tetramethylammonium hydroxide (TMAH), or ethylenediamine-pyrocatechol (EDP). Of these, RIE is preferred to remove unnecessary portions from the viewpoint of avoiding etching of the structure 40.

Secondly, the unnecessary portion of the insulating layers below the lower side of the substrate 11, i.e., the fifth insulating layer 125 and the sixth insulating layer 126 are removed, and thereafter the unnecessary portion of the substrate 11 is removed (FIG. 4(e)). As used herein, the term "unnecessary portion" refers to the portion that does not overlap the peripheral portion 24 in plan view of the device 10.

The unnecessary portion can be removed by the same processing as for removing the insulating layers on and above the substrate 11. In particular, the removal of the unnecessary portion of the insulating layers on and below the substrate 11 is preferably performed by RIE. The removal of the unnecessary portion of the substrate 11 is preferably achieved by deep reactive ion etching (DRIE) in which an etching process using sulfur hexafluoride ($SF_6$) and a passivation process using a fluoroalkane gas, such as octafluorocyclobutane ($C_4F_8$), are alternated.

The device 10 shown in FIG. 9 can be produced in the same manner as for the device 10 of FIG. 1, except that the removal of unnecessary portions in step 4 (forming the bridge structure 20) illustrated in FIG. 4(d) is not performed. Again, it is recommended that a portion of the fourth insulating layer 124 on each of the pads 32 and, if necessary, a portion of the second insulating layer 34 on each of the pads 32 be removed to expose the pads 32.

While the device of the invention has been described with reference to its preferred embodiments, the invention is not deemed to be limited to these embodiments.

The above embodiments embrace the following technical concept.

1. A gas concentration measuring device comprising:
   a heat generating resistor that generates heat when electricity is supplied; and
   a stage supporting the resistor,
   the resistor and the stage overlapping in plan view, and the device being configured to measure an analyte gas concentration in a sample gas on the basis of the resistance of the resistor.
2. The device according to clause 1, wherein the heat generating resistor and the stage have a total thermal capacity of $1.0 \times 10^{-10}$ to $3.2 \times 10^{-2}$ J/K.
3. The device according to clause 1 or 2, further comprising a single bridge or a plurality of bridges extending from the periphery of the stage to form a bridge structure.
4. The device according to any one of clauses 1 to 3, wherein the analyte gas is oxygen, water vapor, or carbon dioxide.
5. The device according to any one of clauses 1 to 4, wherein the analyte gas is oxygen.
6. The device according to clause 3, wherein the heat generating resistor comprises a continuous strand,
   the continuous strand comprises a single strand or a plurality of strands having at least both ends in common,
   at least two of the bridges extend from the periphery of the stage, and
   the continuous strand extends through each of the two bridges.
7. The device according to clause 3 or 6, wherein the stage has a plan view area S of $3.6 \times 10^7$ $\mu m^2$ or less.
8. The device according to any one of clauses 3, 6, and 7, wherein the ratio of a plan view area S of the stage to the total volume V of the resistor and the stage, S/V, is 0.0010 to 10 $\mu m^{-1}$.
9. The device according to any of clauses 1 to 8, wherein the heat generating resistor has a TCR $\alpha_t$ at 25° C. of 100 ppm/° C. or more.
10. The device according to any one of clauses 1 to 9, wherein the heat generating resistor contains platinum or a platinum-containing alloy.
11. The device according to any one of clauses 1 to 10, wherein the heat generating resistor is the only analyte gas-sensitive element of the device.
12. The device according to any one of clauses 1 to 11, wherein the stage has a plan view area S of $3.6 \times 10^7$ $\mu m^2$ or less, the ratio of S to the total volume V of the resistor and the stage, S/V, being 0.0010 to 10 $\mu m^{-1}$, and the device is configured to measure an oxygen gas concentration in a sample gas on the basis of the resistance of the resistor.
13. A method for measuring a concentration of an analyte gas in a sample gas, comprising using the device according to any one of clauses 1 to 12.
14. The method according to clause 13, wherein the oxygen gas concentration is measured while the temperature difference between the heat generating resistor and the sample gas is maintained at 30° C. or more by supplying electricity to the heat generating resistor.
15. The method according to clause 13 or 14, wherein the sample gas contains oxygen gas and nitrogen gas.

EXAMPLES

The invention will now be illustrated in more detail with reference to Examples, but it should be understood that the invention is not construed as being limited thereto.

Example 1

The device 10 shown in FIGS. 1 through 3 was produced.
Formation of Insulating Layers A 500 μm thick silicon substrate 11 having a crystal orientation of <100> was prepared. The substrate 11 was thermally oxidized to form a first insulating layer 121 of $SiO_2$ and a fifth insulating layer 125 of $SiO_2$ on the surface thereof. Each of the first and fifth insulating layers 121 and 125 had a thickness of 600 nm. A second insulating layer 122 and a sixth insulating layer 126 were then both formed of $SiN_x$ by LP-CVD. Each of the second and the sixth insulating layers 122 and 126 had a thickness of 200 nm. A third insulating layer 123 of $SiO_2$ was then formed on the second insulating layer 122 by PECVD. The third insulating layer 123 had a thickness of 1000 nm.
Formation of Resistor 31

A first adhesion layer 33, a resistor 31 and a pair of pads 32, and a second adhesion layer 34 were formed in this order on the third insulating layer 123 by sputtering and patterning in accordance with the processes described above. The patterning for the first and second adhesion layers 33 and 34 was accomplished by lift-off, and that for resistor 31 and pads 32 was performed by milling.

In the formation of the resistor 31 and the pads 32, platinum was used as a sputtering target.

In the formation of the first and second adhesion layers 33 and 34, tantalum was used as a sputtering target.

The thicknesses of the resistor 31, the first adhesion layer 33, and the second adhesion layer 34 were 0.3 μm, 0.02 μm, and 0.02 μm, respectively.
Formation of Fourth Insulating Layer 124

A fourth insulating layer 124 of $SiO_2$ was formed on the third insulating layer by the same process as for the third insulating layer 123. The thickness of the fourth insulating layer 124 was 4000 nm. The thicknesses of the above-described layers were calculated from the deposition rates and times.
Formation of Bridge Structure 20

The unnecessary portions of the insulating layers located on and above the substrate 11, i.e., the first, second, third, and fourth insulating layers 121, 122, 123, and 124 were removed by RIE.

The unnecessary portion of the insulating layers located on and below the substrate 11, i.e., the fifth and sixth insulating layer layers 125 and 126 was removed by RIE, thereby providing a gas concentration measuring device. The unnecessary portion of the substrate 11 was performed by DRIE in which an etching process using $SF_6$ and a passivation process using $C_4F_8$ alternated.

Example 2

The device 10 shown in FIGS. 5 through 7 was made as follows.

A silicon stage 21 with <100> crystal orientation and a thickness of 290 μm was prepared. A 0.3 μm thick resistor 31 and a pair of pads 32 were formed on one side of the stage 21 by co-sputtering using a 2-inch platinum and a 2-inch $Y_2O_3$ target. DC sputtering was used for platinum, while RF sputtering was applied for $Y_2O_3$. As a sputtering gas, argon gas was introduced at a flow rate of 50 sccm and a pressure of 4 Pa. Co-sputtering occurred at room temperature, with powers of 90 W and 200 W supplied to the respective targets. The resulting resistor 31 contained 25 vol % $Y_2O_3$ and 75 vol % Pt.

Platinum paste was applied to the two pads 32 and two portions on the other side of the stage 21 opposite to the pads 32 and fired at 700° C. for 1 hour in the atmosphere to form bonds 37. A Pt wire (bridge 22) with a diameter of 50 μm was bonded at one end thereof to each of the platinum paste bonds 37 by resistance welding. The Pt wires were bonded at their opposite ends to respective terminals 52 by resistance welding. Thus, the stage 21 was secured to the terminals 52 via the bridges 22, thereby providing a gas concentration measuring device.

Example 3

A gas concentration measuring device was obtained in the same manner as in Example 2, except that a 0.26 mm thick alumina substrate was used as a stage 21 and that a 13 μm thick resistor 31 and pads 32 were formed on one side of the substrate by screen printing using Pt paste.

Example 4

A device 10 shown in FIGS. 1 through 3 was made in the same manner as in Example 1, except for changing the thicknesses of the substrate 11 and the fourth insulating layer 124 to 300 μm and 1000 nm, respectively.

Example 5

A device 10 of FIGS. 9 to 11, which had no bridges 22, was made in the same manner as in Example 1, except that (1) the thicknesses of the substrate 11 and the fourth insulating layer 124 were changed to 300 μm and 1000 nm, respectively, and (2), in the step of "formation of bridge structure 20", only a portion of the fourth insulating layer 124 on each of the pads 32 was removed to expose the pads 32, so that the bridge structure 20 was not fabricated.

Comparative Example 1

Figure 8:
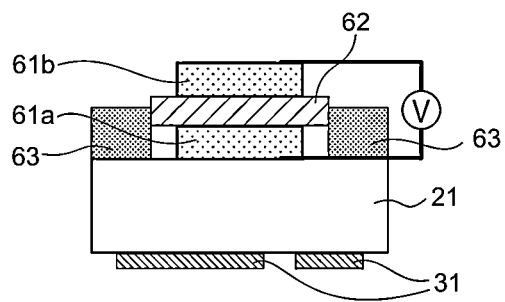
FIG. 8 is a cross-sectional view of the gas concentration measuring device of Comparative Example 1, corresponding to FIG. 7.

A gas concentration measuring device shown in FIG. 8 was fabricated in the same manner as in Example 3 except for the following.

After the resistor 31 was formed on one side of the stage 21, a cell composed of a Pt electrode 61a, a perovskite $La_{0.6}Sr_{0.4}Co_{0.2}Fe_{0.8}O_{3-\delta}$ complex oxide electrode 61b, and a lanthanum silicate solid electrolyte 62 interposed between the electrodes 61a and 61b was attached to the other side of the stage 21 using Pt paste. A glass sealant 63 was applied in an air atmosphere to seal the electrode 61a, which was closer to the stage 21 than the electrode 61b.

The gas concentration measuring device of Comparative Example 1 was configured to measure an oxygen concentration on the basis of the concentration electromotive force generated between the electrodes 61a and 61b, and the resistor 31 was to heat the solid electrolyte 62.

Evaluation

Measurement of S, V, and Thermal Capacity

The thicknesses of the layers constituting the stage 21 and the resistor 31 in Examples 1, 4, and 5 were calculated from the respective film deposition rates calculated previously. In Examples 2 and 3, the thicknesses of the stage 21 and resistor 31 were measured with a slide gauge.

The dimensions other than the thickness of the stage 21 and resistor 31 were measured using a Keyence VHX-8000 microscope or a slide gauge.

The plan view area S of the stage 21 and the total volume V and total thermal capacity of the resistor 31 and the stage 21 were calculated from the measured dimensions and the specific heat and density of the materials forming the constituent layers. The results are shown in Table 1.

Determination of Response to Oxygen Gas Concentration

The oxygen concentration response of the resistor 31 when electricity is supplied was determined under the following conditions.

Energization conditions: constant power drive at 40 mW, 50 mW, 80 mW, 700 mW, or 1300 mW under atmospheric pressure Gas flow rate: 100 sccm Sample gas: oxygen-nitrogen mixed gas Sample gas temperature: room temperature (25° C.)

The oxygen gas concentration in the sample gas was:
- 140-240 sec. after start of measurement: 100 vol %
- 240-340 sec. after start of measurement: 80 vol %
- 340-440 sec. after start of measurement: 60 vol %
- 440-540 sec. after start of measurement: 40 vol %
- 540-640 sec. after start of measurement: 21 vol %
- 640-740 sec. after start of measurement: 10 vol %
- 740-800 sec. after start of measurement: 21 vol %

Figure 12:
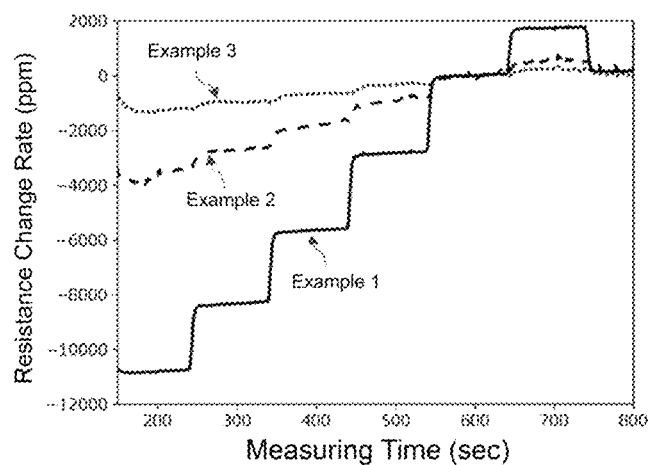
FIG. 12 is a graph showing a relationship between the measuring time and the resistance change rate of the heat generating resistor when supplied with a constant power of 80 mW in the gas concentration measuring devices of Examples 1 to 3.

The resistance change rates of the resistors 31 when electricity is supplied to 80 mW under a constant power condition are shown in FIG. 12. The resistance change rate is a value (ppm) calculated by the formula below using the resistance of the resistor 31 when the oxygen concentration in the sample gas was 21 vol %. In the formula, Rx is the resistance at an oxygen concentration of x vol %, and $R_{21}$ is the resistance at an oxygen concentration of 21 vol %.

$$\text{Resistance change rate} = (R_x - R_{21})/R_{21} \times 10^6$$

The temperature of the resistor 31 during the constant power supply and the difference between this temperature and the room temperature (the temperature of the sample gas) ΔT are shown in Table 2. The temperature of the resistor 31 was measured in the environment with an oxygen concentration of 21% using a FLIR T640 thermal camera with a close-up lens as a radiation thermometer. The emissivity was set to 0.66 in Example 1, 0.63 in Example 2, 0.88 in Example 3 and Comparative Example 1, and 0.70 in Examples 4 and 5. In Table 2, "-" indicates unmeasured.

Sensitivity Calculation

Figure 13:
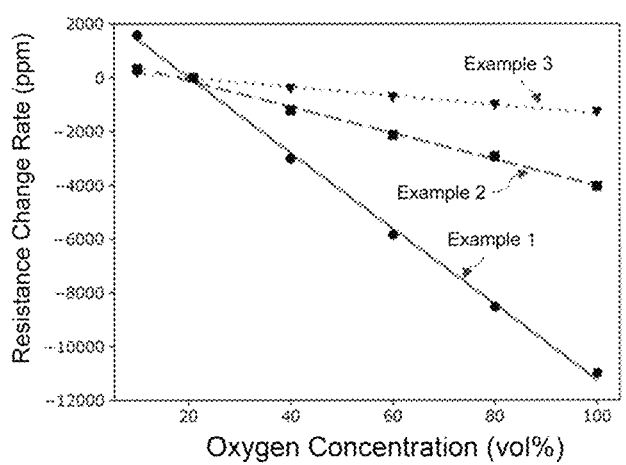
FIG. 13 is a graph showing a relationship between the oxygen gas concentration of the sample gas and the resistance change rate of the heat generating resistor when supplied with a constant power of 80 mW in the gas concentration measuring devices of Examples 1 to 3.

The resistance change rate (ppm) obtained by the determination of response to oxygen gas concentration was plotted against the oxygen concentration (%) of the sample gas. A linear regression line of the plot was obtained by the least squares method, and the slope of the linear regression line was calculated as the sensitivity. The results are presented in Table 2. FIG. 13 is the graph showing the relationship between the resistance change rate of the resistor 31 when electricity is supplied under a constant power supply of 80 mW and the oxygen concentration.

Evaluation of Response Speed

After changing the oxygen concentration from 60% to 90%, the response time required from 10% to 90% of the sensor output was taken as the response speed (sec) and compared between the devices of Example 3 and Comparative Example 1. The sensor output of Example 3 was the resistance of the resistor, while that of Comparative Example 1 was the electromotive force generated between the electrodes. The energization condition was a constant power supply of 1300 mW. The flow rate in Comparative Example 1 was 50 sccm. The test conditions were otherwise the same as in the determination of oxygen concentration response. The results are presented in Table 2.

Determination of TCR $\alpha_t$

The resistance change rate of the resistor 31 when heated to 500° C. was determined using, as a reference, the resistance of the resistor 31 at 25° C. with the oxygen concentration of 21 vol % of the sample gas with an Instec hot and cold stage according to the formula: $(R_{500}-R_{25})/R_{25}/(500-25)\times10^6$ (ppm/° C.), where $R_{500}$ is the resistance at 500° C., and $R_{25}$ is the resistance at the reference temperature of 25° C. The results obtained are shown in Table 1.

As demonstrated in FIG. 13 and Table 2, the oxygen concentrations in the sample gas and the resistances of the resistor 31 show a good linear relationship. Thus, it has been proved that the gas concentration measuring device of the invention is capable of measuring the oxygen concentration of a sample gas with high accuracy even when the sample gas is a mixture of oxygen and nitrogen, despite the fact that the device can be manufactured in a simple and easy way. In contrast, the device of Comparative Example 1 has room for improvement in terms of complexity of the manufacturing processes.

INDUSTRIAL APPLICABILITY

The invention provides a gas concentration measuring device that can be manufactured in a simple and easy manner.

The invention claimed is:

1. A method for measuring a concentration of oxygen gas in a sample gas, the method comprising:
   receiving the sample gas containing the oxygen gas and nitrogen gas via a gas concentration measuring device, wherein the gas concentration measuring device includes:
   a heat generating resistor configured to generate heat when electricity is supplied thereto; and
   a stage supporting the heat generating resistor; and
   measuring the concentration of the oxygen gas in the sample gas based on a resistance of the heat generating resistor of the gas concentration measuring device,
   wherein the heat generating resistor and the stage overlap each other in a plan view,
   the stage has an area S of $1.0\times106$ μm² or less in the plan view, and
   a ratio of the area S to a total volume V of the heat generating resistor and the stage, S/V, is in a range of 0.0010 μm⁻¹ to 10 μm⁻¹.

TABLE 1

| | Area S (μm²) | Volume V (μm³) | Thickness of Stage (μm) | S/V (μm⁻¹) | Thermal Capacity (J/K) | TCR $\alpha_t$ (ppm/° C.) |
|---|---|---|---|---|---|---|
| Example 1 | $2.5 \times 10^5$ | $1.4 \times 10^6$ | 5.6 | 0.1786 | $8.1 \times 10^{-6}$ | 1169 |
| Example 2 | $4.3 \times 10^6$ | $1.2 \times 10^9$ | 290 | 0.0034 | $2.5 \times 10^{-3}$ | 2972 |
| Example 3 | $1.6 \times 10^7$ | $4.2 \times 10^9$ | 264 | 0.0038 | $1.4 \times 10^{-2}$ | 1775 |
| Example 4 | $2.5 \times 10^5$ | $7.5 \times 10^5$ | 3 | 0.3333 | $4.3 \times 10^{-6}$ | 3117 |
| Example 5 | $1.0 \times 10^6$ | $3.0 \times 10^6$ | 3 | 0.3333 | $1.7 \times 10^{-5}$ | 3117 |

TABLE 2

| | Power | | | | | | | | |
|---|---|---|---|---|---|---|---|---|---|
| | 40 mW | | | 50 mW | | | 80 mW | | |
| | Sensitivity | Resistor Temp. (° C.) | ΔT (° C.) | Sensitivity | Resistor Temp. (° C.) | ΔT (° C.) | Sensitivity | Resistor Temp. (° C.) | ΔT (° C.) |
| Ex. 1 | 91.4 | 372.02 | 347.02 | — | — | — | 140.6 | 600.18 | 575.18 |
| Ex. 2 | 26.1 | 88.2 | 63.2 | — | — | — | 48.9 | 105.7 | 80.7 |
| Ex. 3 | 7.6 | 60.8 | 35.8 | — | — | — | 17.5 | 87.7 | 62.7 |
| Ex. 4 | — | — | — | 153 | 405.1 | 380.1 | — | — | — |
| Ex. 5 | 119 | 318.6 | 293.6 | 146 | 382.4 | 357.4 | — | — | — |
| Comp. Ex. 1 | — | — | — | — | — | — | — | — | — |

| | Power | | | | | |
|---|---|---|---|---|---|---|
| | 700 mW | | | 1300 mW | | |
| | Sensitivity | Resistor Temp. (° C.) | ΔT (° C.) | Sensitivity | Resistor Temp. (° C.) | ΔT (° C.) | Response Speed (s) |
| Ex. 1 | — | — | — | — | — | — | — |
| Ex. 2 | 130.4 | 575.9 | 550.9 | — | — | — | — |
| Ex. 3 | 109.3 | 286.5 | 261.5 | 98.4 | 682.6 | 657.6 | 10 |
| Ex. 4 | — | — | — | — | — | — | — |
| Ex. 5 | — | — | — | — | — | — | — |
| Comp. Ex. 1 | — | — | — | — | — | — | 22 |

2. The method according to claim 1,
wherein the concentration of the oxygen gas is measured while a temperature difference between the heat generating resistor and the sample gas is maintained at 30° C. or more by supplying the electricity to the heat generating resistor.

* * * * *